(No Model.)  2 Sheets—Sheet 1.

F. A. WELLER.
ELECTRICALLY CONTROLLED CLUTCH.

No. 559,240.  Patented Apr. 28, 1896.

Witnesses.  Inventor.
John F. Nelson.
Nellie A. Morgan.  Franklin A. Weller (No Model.) 2 Sheets—Sheet 2.
F. A. WELLER.
ELECTRICALLY CONTROLLED CLUTCH.
No. 559,240. Patented Apr. 28, 1896.
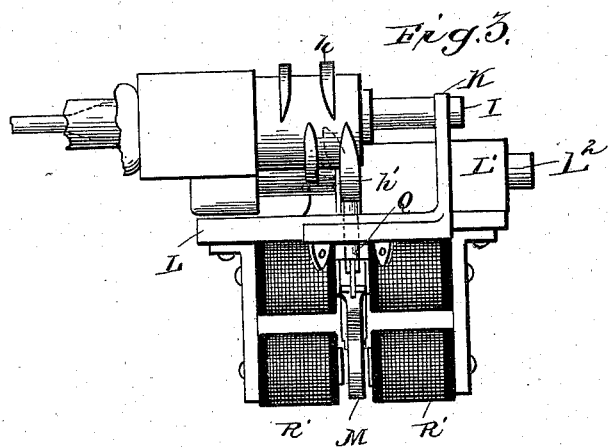

UNITED STATES PATENT OFFICE.

FRANKLIN A. WELLER, OF BOSTON, MASSACHUSETTS.

ELECTRICALLY-CONTROLLED CLUTCH.

SPECIFICATION forming part of Letters Patent No. 559,240, dated April 28, 1896.

Application filed April 20, 1892. Serial No. 429,928. (No model.)

*To all whom it may concern:*

Be it known that I, FRANKLIN A. WELLER, a citizen of the United States, residing in the city of Boston, county of Suffolk, Commonwealth of Massachusetts, have invented an Improved Electrically-Controlled Clutch, useful in connection with systems of transmission of power where belts and clutch-pulleys are employed, of which the following is a specification.

The object of my invention is to provide means for operating the mechanisms commonly used for throwing on or off the clutch by an electromechanical device that enables me at points remote from the clutch to nominally control it by means of an ordinary circuit-closing key or push-button, several of which may be introduced along the conductors forming the circuit in which are incorporated the electromagnets and the source of electric current which serves to operate the controlling electromechanical device.

Figure 1:
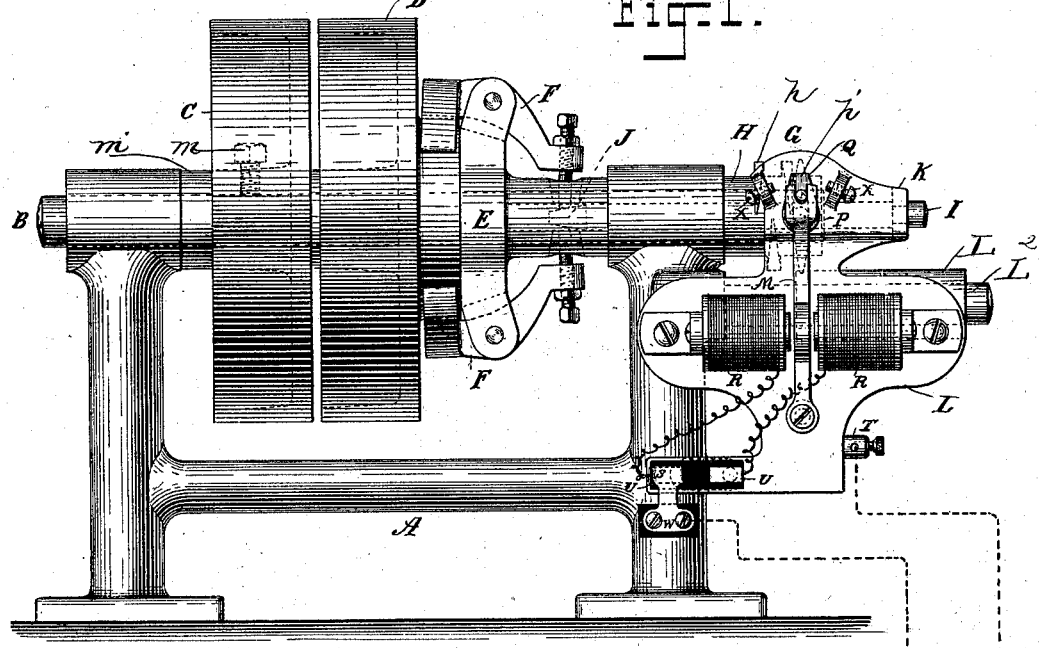
Figure 2:
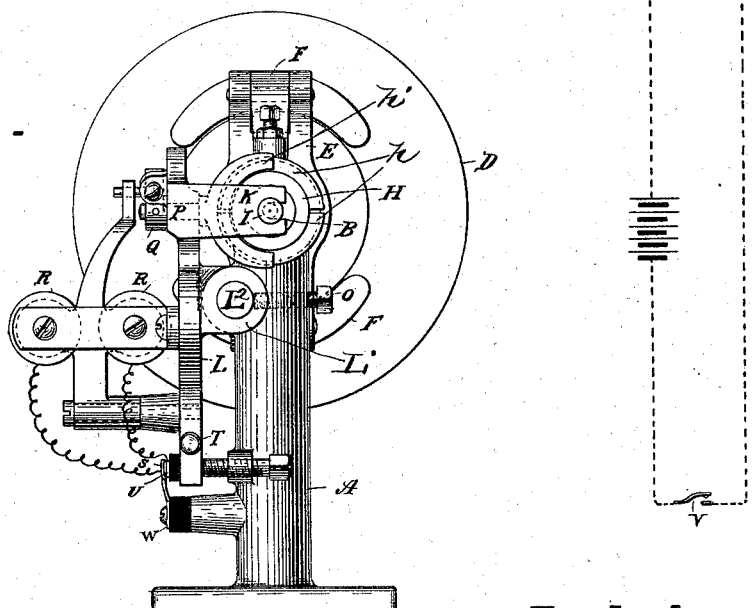

By referring to the drawings, Figure 1 is a side elevation; Fig. 2, an end view, and Fig. 3 is a detail top plan.

The form of apparatus used to illustrate my invention herein shown consists of a frame A, shaft B, upon which are mounted the pulley C, which is secured permanently to the shaft by the set-screw $m$, passing through the hub $m'$ of the pulley, and the clutch or loose pulley D and the clutch-block E, to which are pivoted by pins the clamping-pawls F. On the opposite end of the shaft at G is fastened a cylindrical sleeve H, upon the periphery of which is cut right and left hand inclines or threads. The shaft is provided with a central opening, in which is inserted a rod I, tapered at J, which engages with the projecting set-screws contained in the pawls F. When the rod is moved either forward or backward, it causes the pawls to grip or loosen their hold upon the loose pulley D. Upon the portion of the rod I that is extended beyond the shaft there is a groove cut, so as to admit the forked arm K.

In Fig. 2 K is attached to and forms part of the movable support L, which is provided on its inner side with an elongated bearing L', surrounding a stud $L^2$. Thus the support is arranged to slide back and forth on the stud, which latter is fastened to the frame A by the set-screw O. Upon the cylindrical sleeve H there is provided a compound screw-thread $h$ or oppositely-arranged inclines, in connection with which there is a spanner $h'$, semicircularly formed, having a stem or shaft P projecting through the plate L. When the spanner is inclined in the direction it is desired the clutch to be shifted, it will engage in the grooves correspondingly formed by the threads on the member H, and whenever the stem of the spanner is reversed, so as to coincide with the reversed pitch of the other threads, it will follow in an opposite direction. The stem or shaft which carries the semicircular piece or spanner projects through the plate L, and is provided with an arm Q, whose movement is limited by means of the set-screws X X. It follows that when the movable support is in a position to the right or outer end of the shaft B while it is rotating, the spanner-stem being rotated to the left, the end of the semicircular piece or spanner will engage in the right-hand screw-thread and will be carried to the left, thereby moving the support L and the inner rod I to the left. The tapered end of the rod I, operating upon the forked arm K, serves to engage the clutching device upon the pulley D. When the spanner-piece is reversed and its position changed with its connecting parts from left to right, the clutching device is removed and the shaft and other parts of the device are permitted to revolve independently of the pulley D.

The spanner-piece is made to correspond with the thread which is cut upon the cylindrical sleeve H, and is attached to the shaft P, Fig. 2, and is rotated to the right or left by the armature acting in conjunction with the two sets of electromagnets R R', and the movement of the operating parts forming the spanner-piece and its connecting parts is accomplished by the movement of the armature, which engages with the pin in the arm Q, so that when the armature has been caused to move to the extreme right or left the spanner-piece is directed so as to take up the lead of the thread, which in turn moves forward the support L and changes the route that the current is to traverse to the reverse set of electromagnets. Thus when the current is caused to flow it will change the position of the armature, thereby causing the spanner-piece to reverse and take up the lead of the thread in an opposite direction, and it follows that whenever contact is made so as to cause the armature to operate it will respond, changing the contacts, so as to cause the clutch mechanism to operate in a reversed direction.

I have shown the circuit leading from the battery connected to a key or push-button V to the binding-post T, which is electrically united to the support L. One side of both sets of electromagnets is electrically united to the support and the opposite terminals are led to the contact-pieces U, which are mounted upon a support of insulating material carried upon the support L, forming contact with the opposite terminal spring of the battery at W. By following the movement of the parts it will be observed that when the support L and its coöperating parts are moved to the right contact will be made through the set of electromagnets R and the contact S along the circuit leading from the terminal spring W, and when the support L and its coöperating parts have been carried to the reverse position the current will be caused to flow through the electromagnets R' and the contact-piece S, then following the route through the parts, as before. It is obvious that when the loose pulley is in a position of rest the support L and its connecting parts are in a position to the right, and the circuit is then established through the electromagnets, as is shown in the drawings, and that by causing a current to flow through that set of magnets the semicircular piece takes the right-hand thread and causes the support L and its connecting parts to move forward and operate the clutch device and also change the position of the contact-pieces, so that when the next movement of the armature is made the clutch will be released, and it follows that whenever contact is made, if the clutch is on, it will be thrown off, or vice versa.

From the foregoing it will be seen that I have provided a construction whereby the electromagnet simply controls or sets the true clutch-shifter or actuating mechanism, the latter being driven mechanically after having been first set in position to be operated, as just stated. This clutch-actuating mechanism proper in the embodiment shown consists of the clutch-segments proper for coöperating with the drum and the longitudinally-movable rod I, with the screw and spanner for moving it longitudinally; but it will be understood that while I have shown and described this mechanism in detail I do not wish to be limited specifically thereto, as many other well-known clutch-controllers might be substituted with the exercise of ordinary mechanical skill.

Having thus described my invention, what I claim, and desire to secure by Letters Patent, is—

1. In a clutch-operating mechanism, the combination with the clutch, the continuously-moving driving mechanism, mechanism for moving the clutch into or out of operation actuated by the driving mechanism, and electromagnets for throwing the clutch-actuating mechanism into engagement with the driving mechanism; substantially as described.

2. In a clutch-operating mechanism, the combination with the clutch, the drive-shaft and screw turned thereby, of the spanner coöperating with said screw to move the clutch and an electromagnet for moving the spanner into engagement with the screw; substantially as described.

3. In a clutch-operating mechanism, the combination with the clutch, the drive-shaft, and the right and left inclines or threads turned thereby, of the spanner for coöperating with said inclines or threads to shift the clutch and the electromagnet controlling said spanner, whereby it may be thrown into engagement with either incline or thread; substantially as described.

4. In a clutch-operating mechanism, the combination with the clutch, the drive-shaft and the right and left inclines or threads turned thereby, of the movable support for shifting the clutch, the movable spanner carried by the support for coöperating with the inclines or threads and the electromagnet for moving said spanner to throw it into operative position; substantially as described.

5. In a clutch-operating mechanism, the combination with the clutch, drive-shaft and right and left inclines or threads moved thereby, of the semicircular spanner pivoted on a central axis and coöperating with the inclines or threads to shift the clutch and the two electromagnets for moving said spanner in one direction or the other, whereby it is caused to engage one or the other of the inclines; substantially as described.

6. In a clutch-operating mechanism, the combination with the clutch, drive-shaft and right and left inclines or threads moved thereby of the movable support for shifting the clutch, the spanner coöperating with the inclines or threads to move the support, the electromagnets for turning the spanner and the contact moved by the support and controlling the circuit to the magnet, whereby a single circuit may be employed to turn the spanner in both directions; substantially as described.

7. In a clutch-operating mechanism, the combination with the clutch, drive-shaft and right and left inclines or threads moved thereby, of the movable support for shifting the clutch, the spanner coöperating with the inclines or threads to move the support, the oppositely-arranged electromagnets for turning the spanner in opposite directions and the contacts controlling the circuits to said magnets respectively, moved by the support to establish the circuits at each extreme of its movement and energize the magnet which will shift the spanner into position to reverse the movement of the support; substantially as described.

FRANKLIN A. WELLER.

Witnesses:
 FRED B. JONES,
 NELLIE A. MORGAN.